March 27, 1951 — E. C. BENTSEN — 2,546,423
ROTARY MIXING VALVE
Filed Sept. 7, 1948
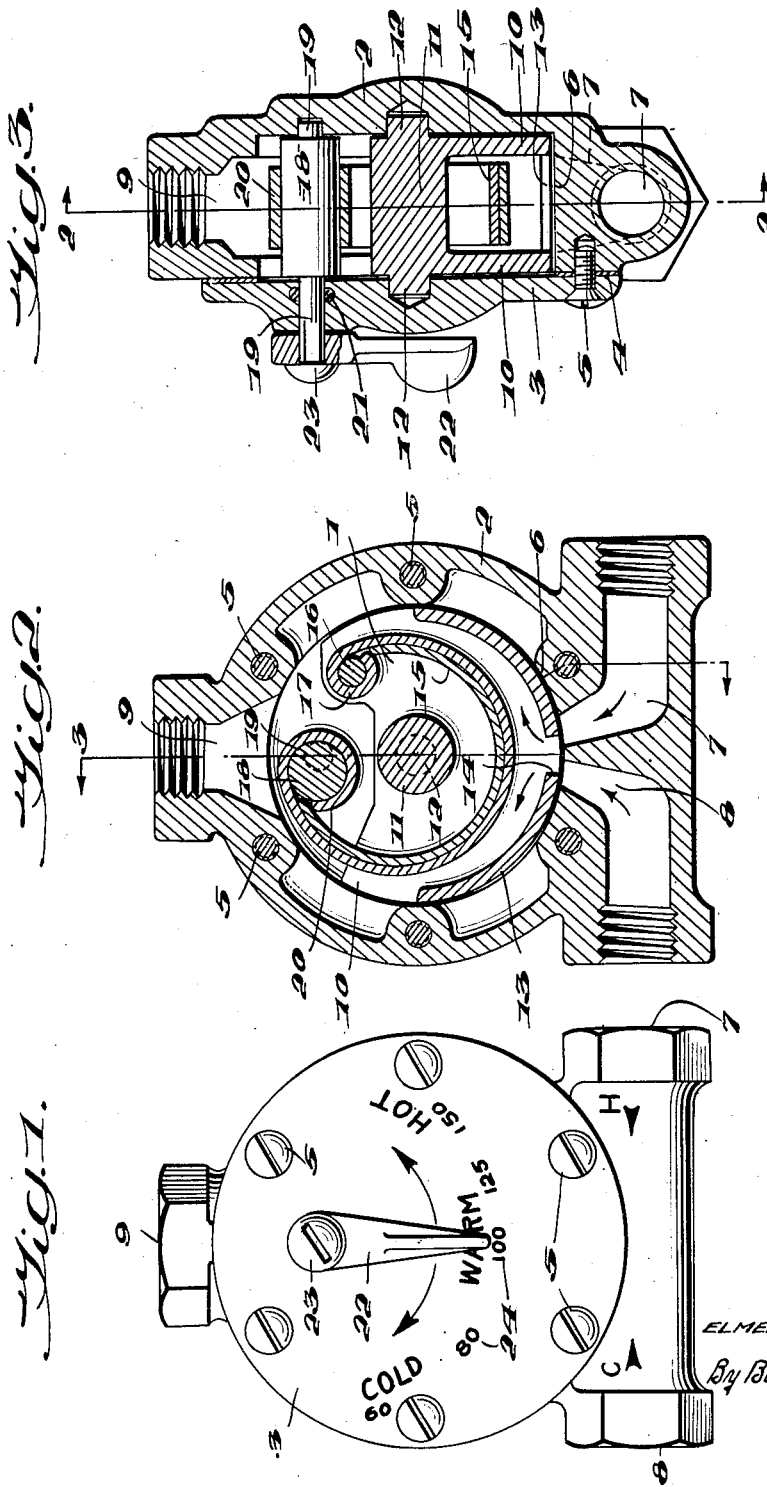
Inventor
ELMER C. BENTSEN,
By Babcock & Babcock
Attorneys Patented Mar. 27, 1951

2,546,423

UNITED STATES PATENT OFFICE 2,546,423

ROTARY MIXING VALVE

Elmer C. Bentsen, Mission, Tex.

Application September 7, 1948, Serial No. 47,957

3 Claims. (Cl. 236—12)

This invention relates to a thermostatically controlled fluid mixing or proportioning valve adapted to regulate the proportionate rates of flow of two different streams of fluid at different temperatures to maintain a substantially constant temperature in the resulting mixture of fluids.

In such a valve it is desirable to utilize an arcuate bimetallic thermostat rather than the usual spiral thermostat, for reasons of economy, dependability, and compactness. However, prior valves utilizing such an arcuate thermostat have required complicated linkages to establish operative connections between the thermostat and the working parts of the valve, together with separate means for regulating the thermostat to control the temperature of the mixed fluids.

Accordingly, the primary objects of the invention are: to provide a simplified construction of rotary mixing valve employing an arcuate thermostat of the bimetallic type in which the thermostat may be directly connected to the valve working parts, without the interposition of any linkages or levers, to directly actuate the valve responsive to variations in temperature within the mixing chamber; and, to provide in such a mixing valve a novel cam actuated adjusting means for the thermostat, operable from the exterior of the valve casing, which also serves as an anchoring or fastening means for one portion of the thermostat, thereby simplifying the construction and promoting economy in the production of such a device.

A further important object is to provide such a valve construction in which the incoming streams of hot and cold fluid both enter the mixing chamber through a common inlet aperture to be rapidly merged and intermingled, and then impinge directly against the thermostat to cause a rapid response thereof to any changes of temperature in the mixed fluids.

A further object is to so construct and arrange the valve rotor and the thermostat relative to each other that together they will define arcuate paths of flow for the incoming fluid through substantially the entire length of the thermostat, thus promoting the rapidity of response thereof to variations in temperature.

A still further object is to provide such a mixing valve embodying a minimum number of simple working parts which may be easily assembled and replaced and are readily accessible for servicing.

In order to attain the foregoing objects and advantages, the invention comprises a casing forming an enclosed mixing chamber having an arcuate valve seat therein, closely adjacent arcuately aligned hot and cold fluid inlet ports respectively entering the chamber through said valve seat, and an outlet port opening from said chamber at a location remote from the inlet ports. A valve rotor is mounted in the chamber for rotary movement about the axis of the arcuate valve seat and has an apertured arcuate plate in close concentric relation with the valve seat, the aperture in said plate being of sufficent arcuate extent to simultaneously register with portions of both of the aforementioned inlet ports, whereby movement of the rotor will serve to control the proportionate flow of fluids through the two inlet ports.

Preferably the valve rotor comprises a pair of axially spaced side plates between which is mounted the aforementioned arcuate valve plate. The arcuate thermostat is disposed about the rotational axis of the rotor with its medial portion roughly concentric to and spaced radially inwardly from the valve plate between the two side plates, to direct the incoming fluid in arcuate paths lengthwise of the thermostat and in intimate engagement therewith. The opposite ends of the thermostat are connected to the casing and the valve rotor respectively at locations eccentric to the rotational axis of the rotor, whereby relative movement of said ends responsive to changes in temperature will product a corresponding rotary movement of the rotor.

In order to provide for adjustment of the valve so that same may be set to maintain the mixed fluids at any selected temperature within a given range, the connection between the valve casing and the thermostat comprises a cam or other connecting element which is movable toward or away from the connection between the thermostat and rotor and manipulable from the exterior of the valve casing.

In the present application I show and describe only the preferred embodiment of my invention, simply by way of illustration of the practice thereof, as by law required. However I recognize that my invention is capable of other and different embodiments and that the several details thereof may be modified in various ways, all without departing from my said invention. Acccordingly, the drawings and description herein are to be considered as merely illustrative and not as exclusive.

In the accompanying drawings:

Figure 1 represents a front elevation of a mixing valve embodying the invention;

Figure 2, a section of said valve taken on the line 2—2 of Figure 3, looking in the direction of the arrows; and, Figure 3, a section on the line 3—3 of Figure 2, looking in the direction of the arrows.

Referring now in detail to the accompanying drawings, the numeral 1 designates the fluid mixing or proportioning chamber, of any suitable preferably cylindrical shape, which is defined by a hollow valve casing 2. Preferably the chamber 1 opens axially through one side of the casing 2, and this opening is normally closed by a cover plate 3. An annular gasket 4 is interposed between the casing 2 and plate 3 to render the connection therebetween fluid tight, and the cover plate 3 is removably secured in place by any suitable means such as a plurality of screws 5.

Formed within the chamber 1 is an arcuate valve seat or surface 6 which may constitute an integral inner wall portion of the casing 2. Opening into the chamber 1 through this valve seat 6 are a pair of relatively arcuately aligned hot and cold fluid inlet ports 7 and 8 respectively, which may be adapted for connection to fluid supply conduits as by internally threading their outer end openings, as shown in Figure 2. It is to be understood of course that heated fluid from any suitable source will normally be directed into the valve through the port 7, and relatively cold fluid from any suitable or usual source will be directed into the valve through the port 8, as is well known in the art.

A discharge port or passage 9 opens through the casing 2 from the mixing chamber 1 at a location remote from, and preferably diametrically opposed to, the inlet ports 7 and 8, said port 9 being internally threaded or otherwise adapted for connection to a suitable outlet or discharge line adapted to convey the mixed fluid at the desired temperature to its destination.

Disposed for rotary movement in the chamber 1 about the axis of the valve seat 6 is a valve rotor which essentially comprises the arcuate valve plate hereinafter described, and mounting or supporting means therefore.

In the preferred embodiment this rotor is formed as an integral casting comprising mounting means in the form of a pair of relatively axially spaced side plates 10—10 connected by a central integral boss 11, and having relatively aligned pivot posts 12—12 projecting axially from opposite external sides thereof, these pivot posts being rotatably journalled in cooperating bearing sockets formed in the axially opposed ends of the chamber 1, as defined by the inner surfaces of the cover plate 3 and the back of casing 2 in the instant embodiment.

The valve plate 13 extends between and is integrally connected to the side plates 10—10, and is carried thereby for rotary movement concentric to the valve seat 6. This valve plate 13 is arcuately curved concentrically with the valve seat 6 and disposed for rotary movement in close concentric relation, preferably in sliding engagement, therewith. Formed through this plate 13 is an inlet aperture or opening 14 disposed and proportioned to register with portions of both inlet ports 7 and 8 and simultaneously admit hot and cold fluids therethrough in relative proportions which will vary with the rotary position of the plate 13. Obviously the opening or aperture 13 will be of sufficient arcuate extent to simultaneously register with portions of both of said inlet ports 7 and 8, and rotary movement of the plate 13 will increase the flow of fluid into the chamber 1 from one of the ports 7 or 8 to the same extent that the influx of fluid through the other of said ports is decreased, thereby controlling the proportionate flow of hot and cold fluids into the chamber 1.

In order to change the position of the valve rotor responsive to changes of temperature of the fluid in the mixing chamber, there is disposed in said chamber a usual bimetallic thermostat element 15 which is arcuately curved and is disposed between the side plates 10—10 of the rotor with its medial portion roughly concentric to and spaced radially inwardly from the valve plate 13. Thus it will be seen that the arcuate space between the thermostat and rotor will define oppositely disposed paths of flow for the fluid entering the chamber 1 through the valve aperture 14, as indicated by the arrows in Figure 2. Accordingly, the hot and cold fluids from the inlet ports 7 and 8, upon passing through the aperture 14 will be immediately merged and intermixed and will impinge directly against the medial portion of the thermostat 15, from whence they will flow arcuately along the thermostat in intimate heat exchanging relation therewith toward the discharge port 9.

With such arrangement the thermostat will respond quite rapidly to variations of temperature in the mixed fluid in chamber 1.

The upwardly directed opposite ends of the thermostat 15 are respectively connected to the valve rotor and to the casing at locations eccentric to the rotational axis 12—12 of the rotor, so that relative movement of these ends responsive to changes in temperature will produce a corresponding rotary movement of the rotor.

A suitable connection between the rotor and the thermostat may be provided by bending or curling one end of the thermostat, as at 17, to form a journal which is rotatably disposed about a crank pin 16 extending between the rotor side plates 10—10 at a location spaced radially from the axis 12—12. Preferably the journal 17 is formed of only a single lamination of metal, the other lamination of the bimetallic thermostat being removed from the journal-forming portion thereof, as shown, in order that variations in temperature will not cause extreme variations in the diameter of said journal with consequent binding on the crank pin 16.

Preferably the connection between the opposite end of the thermostat and the casing is such as to permit adjustment in a way to cause rotary movement of both the valve rotor and thermostat as a unit relative to the valve inlet ports 7 and 8, thereby varying the temperature setting of the valve as desired.

Such a connection in the preferred embodiment comprises a cylindrical cam 18 rotatable about a shaft 19 disposed eccentrically to its cylindrical axis, as in Figure 3, the opposite ends of the shaft 19 being journalled for rotation in the front and back faces or plates of the casing, as shown. The associated end of the thermostat, after having had one of the metal laminations removed therefrom for the reasons aforementioned in connection with journal 17, is curled or bent to form a journal 20. This journal 20 is rotatably disposed about the cylindrical cam 18 so that rotary movement of the cam will alter the circumferential or tangential position of same in the valve casing, thus causing a similar alteration in the positions of journals 20 and 17 and the rotor.

To provide for adjustment of the cam 18 and thermostat 15 from the exterior of the valve casing, one end of the cam shaft 19 is rotatably disposed completely through the cover plate 3, as shown, a seal 21 preferably being provided between said cover plate and shaft to prevent the escape of liquid.

Fixed to the externally projecting end of the shaft 19 is a manual temperature regulating or control handle or lever 22 which is removably secured in place as by a screw 23 threaded into the end of the shaft 19. If desired, the exterior front face of the cover plate 3 may have suitable indicia disposed thereon for cooperation with the handle 22 to indicate the temperature setting of the valve in various positions of the said handle.

It will be seen that the arrangement is such that removal of the cover plate 3 in obvious manner will permit removal of and ready access to the working parts of the valve, for repair or servicing.

In the use of the valve, the inlet ports 7 and 8 will be respectively connected to suitable hot and cold fluid supply conduits or pipes, which may or may not be separately valved. The outlet or discharge port 9 is connected by usual means to deliver the mixed fluid to its desired destination and, if desired, valve means separate from the control valve of the invention may be interposed in the outlet pipe or conduit to control the passage of fluid therethrough from the mixing valve, in usual manner.

In the operation of the mixing valve, hot and cold fluids will flow through the ports 7 and 8 respectively, thence will merge as a single stream passing through the inlet aperture 14 of the valve plate to impinge against the medial portion of the thermostat 15 and then flow in opposite arcuate directions therealong toward the outlet port 9. It will be seen that the passing of the hot and cold fluids through the common aperture 14 will tend to merge and intermix them immediately upon their entry into the mixing chamber 1. The subsequent impingement of the fluid against the thermostat 15 and passage along same in intimate contact therewith will cause the thermostat to respond rapidly to any changes in temperature of the mixed fluid.

Thus with the working parts of the valve disposed in the relative positions indicated in Figure 2, if the temperature of the mixed fluids in chamber 1 should drop below the temperature for which the valve is set, the resulting contraction of the thermostat and drawing of its opposite ends toward each other would cause rotary movement of the valve rotor to place more of the inlet aperture 14 in registry with the hot fluid inlet port, increasing the proportionate flow of fluid into the chamber 1 therefrom, while at the same time decreasing the influx of fluid from the cold fluid port 8 to a substantially equal extent, thereby raising the resultant temperature of the mixed fluid. Should the temperature of the mixed fluids in chamber 1 exceed that for which the valve is set, the action would be just the reverse.

Obviously the valve may be adjusted to maintain the temperature of the mixed fluid at any desired point between the temperatures of the hot and cold fluids supplied thereto, by manipulation of the regulating handle 22 as heretofore described.

It will be seen therefore that I have provided a thermostatically controlled fluid mixing valve which reacts practically instantaneously to compensate for variations in temperature of the fluid controlled thereby, which embodies a simplified construction and minimum number of working parts, and which embodies a novel regulating means.

I claim:

1. A thermostatically controlled fluid mixing valve comprising a casing having a mixing chamber formed therein, an arcuate valve seat formed in said casing within said mixing chamber, said casing having closely adjacent relatively arcuately aligned hot and cold fluid inlet ports respectively opening into said chamber through said arcuate valve seat and an outlet port opening from said chamber at a location remote from said inlet ports, a valve rotor comprising a pair of relatively axially spaced side plates pivotally mounted in said casing for rotary movement about the axis of curvature of said valve seat, and an arcuate valve plate disposed between and carried by said side plates in close concentric relation to said valve seat, said valve plate having an inlet aperture therethrough to be disposed in varying degrees of registry with said inlet ports, in combination with an arcuate bimetallic thermostat disposed in said chamber radially inwardly of said valve plate between said side plates, the medial portion of said thermostat being disposed adjacent said inlet aperture to have the incoming fluid impinge thereon, said thermostat and said rotor together defining arcuate paths of flow for the incoming fluid lengthwise of said thermostat, and means connecting the opposite ends of said thermostat to said valve rotor and said valve casing respectively at locations eccentric to the rotational axis of said rotor, whereby relative movement of said ends responsive to variations in temperature will produce a corresponding rotary adjustment of said rotor, the connecting means between said casing and said thermostat comprising a cam cylinder mounted in said casing for rotation about an axis parallel and eccentric to said rotor, one end of said thermostat being rotatably journalled about said cylinder, and means operable from the exterior of said casing for rotatably adjusting said cylinder.

2. A thermostatically controlled fluid mixing valve comprising a casing having a fluid mixing chamber formed therein, an arcuate valve seat formed in said casing within said mixing chamber, said casing having closely adjacent relatively arcuately aligned hot and cold fluid inlet ports respectively opening into said chamber through said arcuate valve seat and an outlet port opening from said chamber at a location remote from said inlet ports, a valve rotor comprising a pair of relatively axially spaced side plates mounted in said casing for rotary movement about the axis of curvature of said valve seat, and an arcuate valve plate disposed between and carried by said side plates in close concentric relation to said valve seat, said valve plate having an inlet aperture therethrough to be disposed in varying degrees of registry with said inlet ports, in combination with an arcuate bimetallic thermostat disposed in said chamber radially inwardly of said valve plate adjacent said inlet aperture to have the incoming fluid impinge thereon, said relatively spaced thermostat and plate directing the incoming fluid in an arcuate path of flow along said thermostat, and means connecting said thermostat to said valve rotor and said valve casing respectively at locations eccentric to the rotational axis of said rotor, whereby relative distortion of said thermostat responsive to temperature variations will produce a corresponding rotary adjustment of said rotor, the connecting means between said casing and said thermostat comprising a cam rotatably mounted in said casing, said thermostat being rotatably connected to said cam, and means operable from the exterior of said casing for rotating said cam.

3. A thermostatically controlled fluid mixing valve comprising a casing having a fluid mixing chamber formed therein, an arcuate valve seat fixedly disposed within said chamber and having relatively arcuately aligned fluid inlet ports opening therethrough into said chamber, a valve rotor mounted in said chamber for rotary movement about the axis of curvature of said valve seat and comprising an arcuate valve plate in close concentric relation to said valve seat, said plate having an inlet aperture therethrough normally in partial registry with both of said inlet ports, in combination with a thermostat disposed in said chamber and pivotally connected to said valve casing and said rotor respectively at locations eccentric to the rotational axis of said rotor, said thermostat being expandible and contractible in a linear direction between its said respective connections responsive to temperature variations, said connection between the thermostat and valve casing comprising a cam cylinder mounted in said casing for rotation about an axis parallel and eccentric to said rotor, one end of said thermostat being rotatably journalled about said cylinder, whereby rotary movement of said cylinder will vary the bodily circumferential location thereof relative to said rotational axis of the valve rotor, and means operable from the exterior of the casing for rotatably adjusting said cylinder.

ELMER C. BENTSEN.

REFERENCES CITED

The following references are of record in the file of this patent:

UNITED STATES PATENTS

| Number | Name | Date |
| --- | --- | --- |
| 1,715,662 | Laskey | June 4, 1929 |
| 2,069,040 | Lodder | Jan. 26, 1937 |
| 2,146,929 | Bassett | Feb. 14, 1939 |
| 2,473,097 | Hamill | June 14, 1949 |